(No Model.) H., C. & J. TUCKER. 3 Sheets—Sheet 1.
H. & C. TUCKER, Administrators of J. TUCKER, dec'd.
TURNING MACHINE.

No. 405,749. Patented June 25, 1889.

Attest:
F. C. Fischer
J. H. Van Ness

Inventors.
Charles Tucker, Henry Tucker,
and Joseph Tucker (deceased),
per Crane & Miller, attys.

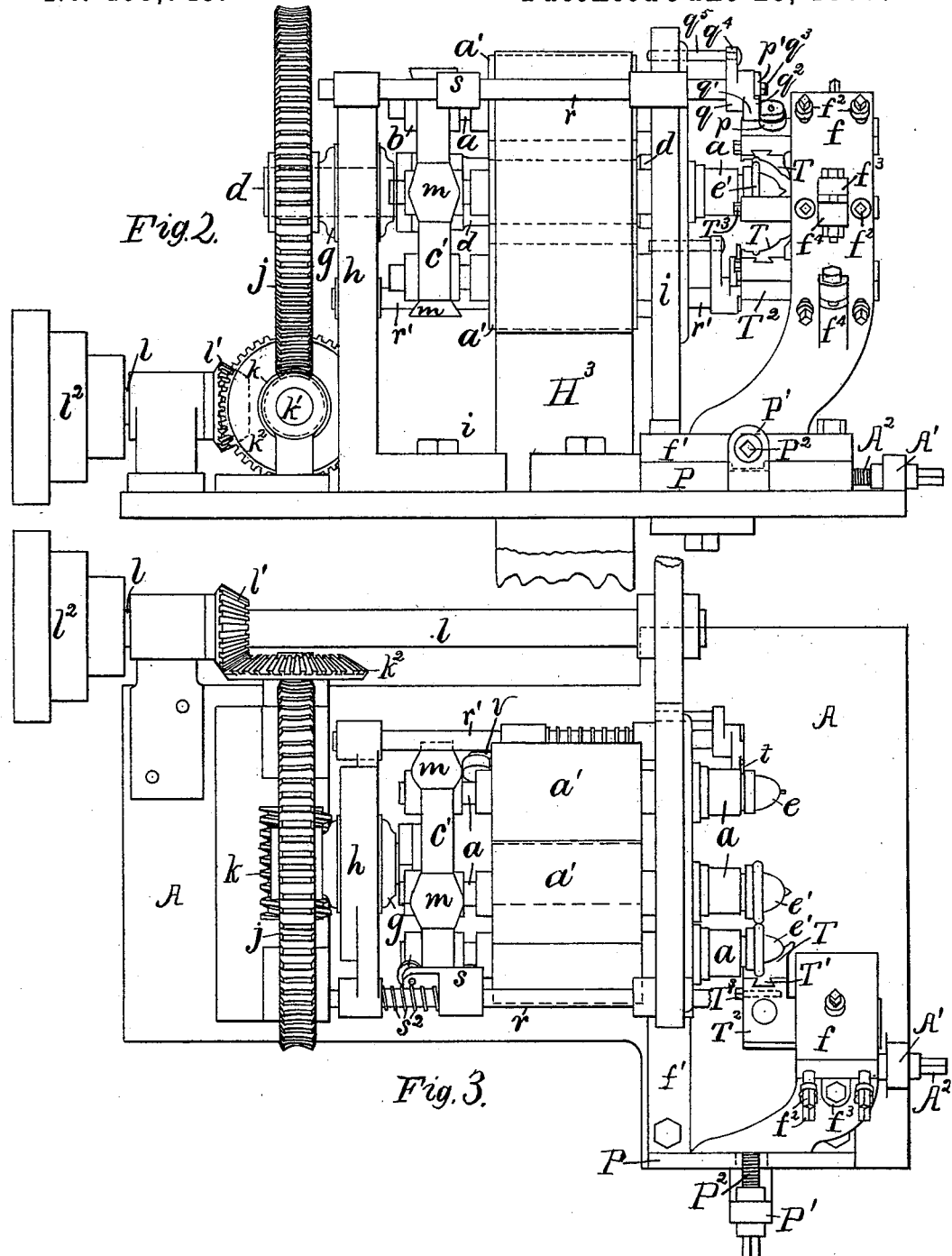

(No Model.) H., C. & J. TUCKER. 3 Sheets—Sheet 3.
H. & C. TUCKER, Administrators of J. TUCKER, dec'd.
TURNING MACHINE.

No. 405,749. Patented June 25, 1889.

Attest:
F. H. Fischer
J. H. Van Ness

Inventors.
Charles Tucker, Henry Tucker,
and Joseph Tucker, (deceased,)
per Graves Miller, Attys.

UNITED STATES PATENT OFFICE.

HENRY TUCKER AND CHARLES TUCKER, OF NEWARK, NEW JERSEY, FOR THEMSELVES AND AS ADMINISTRATORS OF JOSEPH TUCKER, DECEASED.

TURNING-MACHINE.

SPECIFICATION forming part of Letters Patent No. 405,749, dated June 25, 1889.

Application filed August 7, 1888. Serial No. 282,192. (No model.)

*To all whom it may concern:*

Be it known that we, HENRY TUCKER and CHARLES TUCKER, citizens of the United States, residing at Newark, Essex county, New Jersey, and administrators of the estate of JOSEPH TUCKER, deceased, late of Newark, Essex county, New Jersey, together with the said JOSEPH TUCKER, have invented certain new and useful Improvements in Automatic Turning-Machines, fully described and represented in the following specification and the accompanying drawings, forming a part of the same.

The object of this invention is to operate automatically by one or more fixed tools upon a series of rotary articles or objects of uniform character, the objects being sustained upon spindles mounted upon a central arbor; and it consists, essentially, in the combination, with a central arbor, of a series of spindles mounted thereon to rotate about the same, and driven at a greater speed than the said arbor.

It also consists in an adjustable tool-support and a series of tools secured thereon adjacent to the path of the rotating articles, in a presser for forcing the articles upon chucks at the ends of the said spindles, in a stripper for removing the articles after the turning operation, and in various details in the construction thereof.

The machine is especially adapted to operate upon hollow articles of which the interior may be left without the finish required upon their exterior surface.

In the annexed drawings we have shown such articles consisting of caps for pepper or mustard receptacles. Such caps are molded from white metal or other suitable material, and are made of the general shape desired for the finished article, with a cylindrical body and annular bead at one edge of the same and a convex part adjacent to the annular bead. The tools are also shown herein having a cutting-edge with an outline fitting that of the finished article.

Figure 1:
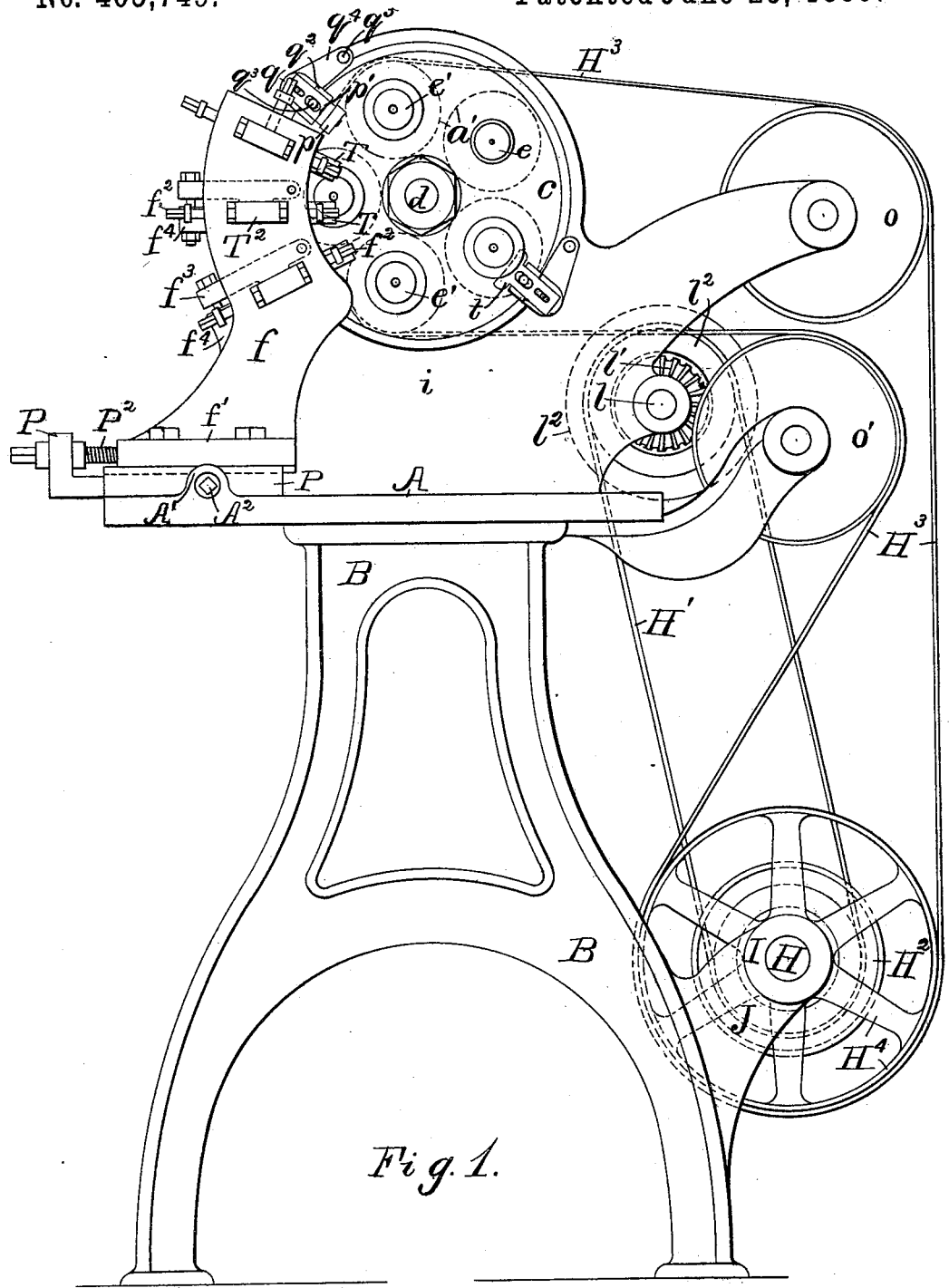
Figure 4:
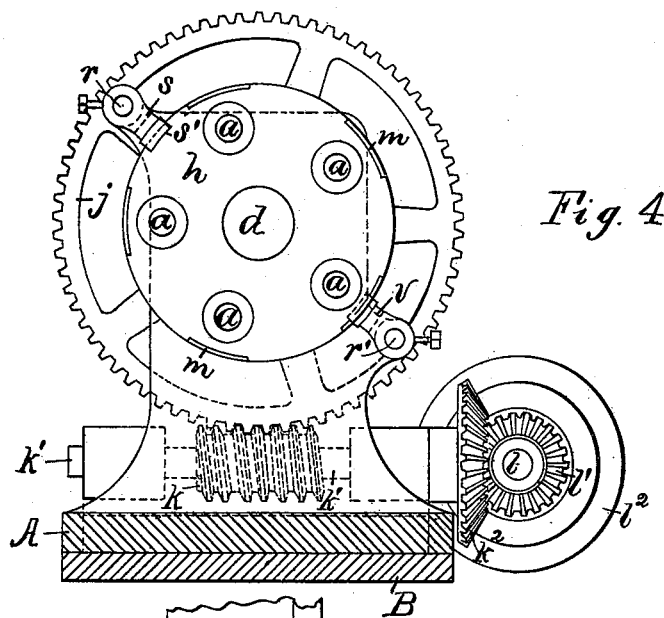
Figure 5:
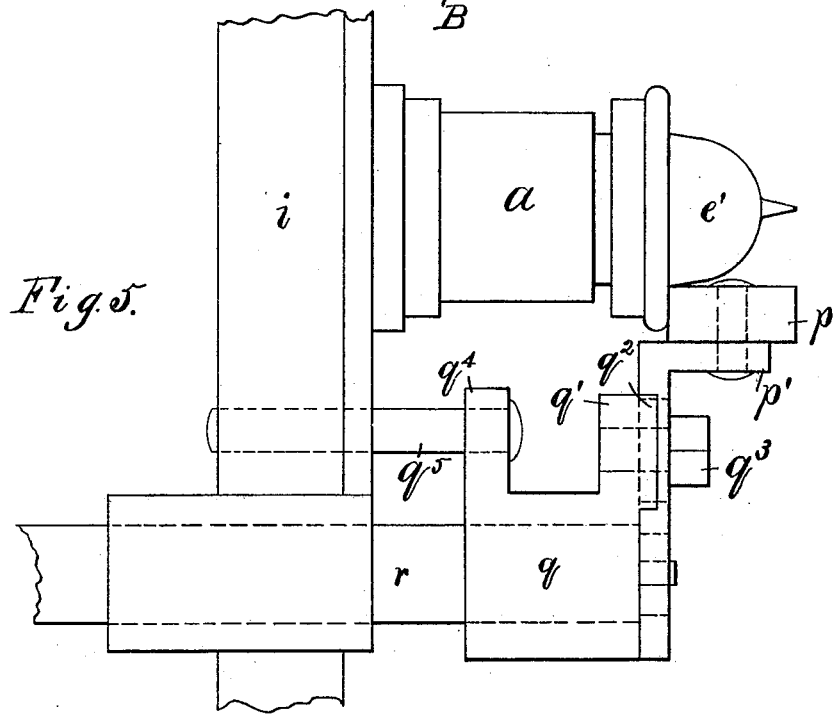

In the drawings, Figure 1 is a front elevation of the entire machine; Fig. 2, a side view of the same, with the frame and parts below the table omitted. Fig. 3 is a plan of the parts shown in Fig. 2; Fig. 4, a section on line $xx$ in Fig. 2; and Fig. 5, a side view of the presser in contact with one of the articles to be turned, showing the operation of the same.

$a\ a$ are a series of parallel spindles, which are mounted in bearings $b\ b$ in two parallel heads $c\ c'$, consisting of thick disks and secured upon a central arbor $d$. Each of the said spindles is provided at its front end with a chuck $e$, to hold the article $e'$ to be operated upon, and has also upon that portion between the heads $c$ and $c'$ a pulley $a'$, by which the same is driven.

$f$ is a tool-support having its body formed concentric with the central arbor and bolted upon the table A at one side thereof. Such tool-support has secured thereon a series of tools arranged with their cutting-edges adjacent to the path of the chucks as they are rotated by the arbor $d$. The rear end of the arbor is supported in bearings $g$ in a bracket $h$, secured to the table of the machine by bolts, and its forward end is supported by the head $c$, the edge of which is fitted in a bearing in the bracket $i$.

The feeding mechanism, which rotates the arbor $d$, consists of a worm-wheel $j$, secured upon the rear end of such arbor and worm $k$. Such worm is mounted on a worm-shaft $k'$, which is driven by the shaft $l$ by means of the bevel-gears $k^2$ and $l'$. The shaft $l$ is connected to the counter-shaft H, which is mounted in bearings I, secured by brackets J to the frame B of the machine by means of a belt H′, passing around the cone-pulleys $l^2$ and $H^2$ upon the shafts $l$ and H, respectively.

The spindles $a\ a$ are driven by a belt $H^3$, passing around a pulley $H^4$ upon the shaft H, over the pulleys $o$ and $o'$, and around the pulleys $a'$ upon the spindles $a$. The pulleys $o$ and $o'$ are merely idlers to direct the belt $H^3$ in the desired manner and to tighten the same. By reference to Fig. 1, it will be seen that the belt $H^3$ is so arranged that it will drive only half the whole number of spindles $a\ a$ at the same time, and that, since the driving-belt comes from that side of the machine opposite the tool-support, the spindles farthest away from the tools will come to rest. It is while the spindle is in such position that the article to be operated upon is applied to the chuck, by hand or by other suitable means. To force the article firmly upon the chuck, a presser is applied thereto. Such presser consists in a roller-bracket $p'$, provided with a roller $p$, arranged to roll in contact with the annular bead upon the article when applied to the chuck $e$ and rotated toward the tool-support, the presser being located a little in advance of such tool-support.

$r$ is a rod mounted in bearings upon the brackets $h$ and $i$, and having secured to its forward end a boss $q$, provided with a flat radial projection $q'$, with ribs $q^2$ upon its edges. Upon such projection $q'$, and across the end of the rod $r$, is secured the roller-bracket $p'$, with the end holding the roller $p$ projecting toward the central arbor $d$ by means of a bolt $q^3$. To prevent the boss from turning, an arm $q^4$ is formed at its rear end, having a dowel $q^5$ at its end, which dowel is adapted to slide freely in an aperture made for its reception in the bracket $i$. Near the rear end of the rod $r$, and fastened upon the same by means of a set-screw, is a dog $s$, provided with a roller $s'$ to avoid the production of any unnecessary friction when the said dog is performing its function. The roller $s'$ rolls in contact with the outer edge of the rear side of the head $c'$, except when engaged by a cam $m$, secured upon the head $c'$ at its periphery and projecting beyond both its faces. The projection of the cam $m$ beyond the rear face of the head $c'$ determines the movement of the dog $s$, and therefore of the presser attached to the rod $r$, upon which the dog is secured. To return the presser to its normal position after its operation, a spring $s^2$ is interposed between the dog $s$ and the rear bearing for the rod $r$, which tends to press the roller $s'$ continually against the head $c'$.

The stripper $t$ consists in a flat T-shaped piece of steel, as shown in Fig. 1, and is applied at a point diametrically opposite the presser and operated by mechanism similar to that operating the presser. The stripper, when in its normal position, is located with its operative end just behind some annular projection upon the article or behind the entire article, as shown herein, and when operated by means of the dog $v$ upon the rod $r'$ in front of the head $c'$ is thrown forward, thus stripping the article from the chuck $e$.

The tools T are constructed with their cutting-edges of the form desired for the outline of the finished article, and each is provided on its opposite side with a tongue T', dovetailed into the end of the shorter arm of a T-shaped holder $T^2$. To permit of the adjustment of the tool vertically within the holder $T^2$, the arm provided with the dovetail for the tongue T' is split, and its parts are clamped upon the tongue T' by means of a clamp-screw $T^3$.

Interposed between the base $f'$ of the tool-support and the table A is a flat plate P, having a transverse groove in its top and a longitudinal tongue in the bottom to fit a tongue upon the bottom of the base $f'$ and a groove in the table, respectively. Ears P' and A' are formed upon the plate P and table A at the ends of the transverse and longitudinal grooves, and adjusting-screws $P^2$ secured therein and projecting into the plate P and the base $f'$ of the tool-rest, respectively, thus permitting of the accurate adjustment of the tool-support laterally.

The longer arm of each of the holders $T^2$ is held laterally in a radial slot in the tool-support by means of the screws $f^2$ bearing against each of its edges, and each of such holders, with the exception of the top one, is pressed firmly against the bottom of the slot in the support by means of a bar $f^3$, pivoted within a transverse slot in the tool-support for its reception, and clamped to the lug $f^4$ upon the outer side of the support adjacent to the outer end of such bar $f^3$. The top holder is clamped to the bottom of its slot by means of a set-screw inserted through the top of the support.

In order to form the cutting-edges of the tools, the blanks for the tools may be applied to the holders, as above described, and in place of the chucks $e$ milling-cutters of the desired form may be applied to the spindles $a$, and the machine then set in motion. The tools will, by such means, be formed of the exact shape desired, but without the necessary clearance for operating upon the objects to be turned. After such tools are hardened properly, they are returned to the holders $T^2$, but set lower in the same, and by such means given the desired clearance for operating upon the articles to be turned.

It is evident from the above description that hollow articles of any desired form may be turned in our machine and with great accuracy, and we do not limit ourselves to any particular form for the tools; neither do we limit ourselves to the number of tools or spindles used, since one tool and one spindle would operate in exactly the same manner as a greater number.

Although we have shown herein the heads $c$ and $c'$ formed of thick disks, it is evidently immaterial how the spindles are supported upon the central arbor. Nor is it material to our invention how the spindles and the central arbor be driven, as the essential feature of the invention is a central arbor having one or more spindles mounted thereon and adapted to carry the article in a circular path to be operated upon by one or more tools.

We are aware of United States Patent No. 28,772 of June 19, 1860, showing a series of spindles mounted upon a central arbor rotated intermittently to convey the stock to be operated upon from one tool to another. Our invention differs from the latter in having a continuously-rotating central arbor, whereby the loss of time in stopping of intervals is avoided. We hereby disclaim the said patent, limiting our invention to the construction claimed herein.

Having thus set forth our invention, what we claim herein is—

1. In a turning-machine, the combination, with a continuously-rotating central arbor, of a series of spindles mounted thereon to rotate about the same and driven at a greater speed than the said arbor, substantially as and for the purpose set forth.

2. In a turning-machine, the combination, with a central arbor, of a series of parallel spindles mounted thereon to rotate about the same and driven at a greater speed than the said arbor, each of said spindles being provided with a chuck for holding the articles to be turned, a pressing-tool for pressing the articles upon the chucks, a tool-support, and a series of tools secured upon the said tool-support with their cutting-edges adjacent to the path of the chucks about the arbor, substantially as shown and described.

3. In a turning-machine, the combination, with a central arbor, of a series of parallel spindles mounted thereon to rotate about the same and driven at a greater speed than the said arbor, each of said spindles being provided with a chuck for holding the articles to be turned, a pressing-tool for pressing the articles upon the chucks, a tool-support, a series of tools secured upon the said tool-support with their cutting-edges adjacent to the path of the chucks about the arbor, and a stripping-tool for removing the articles from the chucks, substantially as shown and described.

4. In a turning-machine, the combination, with a central arbor, of a series of parallel spindles mounted thereon to rotate about the same and driven at a greater speed than the said arbor, each of such spindles being provided with a chuck for holding the articles to be turned, a pressing-tool for pressing the articles upon the chucks, an adjustable tool-support, a series of tools secured upon the said tool-support with their cutting-edges adjacent to the path of the chucks about the arbor, and a stripping-tool for removing the articles from the chucks, substantially as described.

In testimony whereof we have hereunto set our hands in the presence of two subscribing witnesses.

HENRY TUCKER.
CHARLES TUCKER.
HENRY TUCKER,
CHARLES TUCKER,
*Administrators of the estate of Joseph Tucker, deceased.*

Witnesses:
H. J. MILLER,
F. C. FISCHER.